(12) United States Patent
Helander et al.

(10) Patent No.: US 7,533,007 B2
(45) Date of Patent: May 12, 2009

(54) METHOD AND APPARATUS FOR CONSTRAINED SYSTEM ATTRIBUTE ALLOCATION UNDER UNCERTAIN USAGE PROFILES

(75) Inventors: Mary E. Helander, Brookline, MA (US); Bonnie K. Ray, South Nyack, NY (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/869,873

(22) Filed: Jun. 18, 2004

(65) Prior Publication Data

US 2005/0283390 A1    Dec. 22, 2005

(51) Int. Cl.
*G06F 17/10* (2006.01)
(52) U.S. Cl. .......................................... 703/2
(58) Field of Classification Search .............. 703/2, 703/6
See application file for complete search history.

(56) References Cited

OTHER PUBLICATIONS

Nielsen et al.; A Mathematical Model of the Finding of Usability Problems; 1993, ACM Interchi; pp. 206-213.*
Moses: Bayesian probability distributions for assessing measurement of subjective software attributes; Information and Software Technology 42 (2000) 533-546.*
Y-W Leung, "Software reliability allocation under an uncertain operational profile," 1997, Journal of the Operational Research Society, vol. 48, pp. 401-411.
Mary E. Helander, Ming Zhao, and Niclas Ohlsson, "Planning Models for Software Reliability and Cost," 1998, Paper submitted to IEEE Transactions on Software Engineering, pp. 1-37.
Mary E. Helander, "Robust Planning Profiles," Jul. 15, 1977, Paper submitted to ACM Transactions on Software and Engineering & Methodology, pp. 1-42.

* cited by examiner

*Primary Examiner*—Hugh Jones
(74) *Attorney, Agent, or Firm*—McGinn IP Law Group, PLLC

(57) ABSTRACT

A method (and structure) of planning allocation of life cycle resources for a system including a plurality of components whereby the system inherits attributes from its components according to its structural architecture and in terms of an uncertainty of usage in operation.

22 Claims, 8 Drawing Sheets

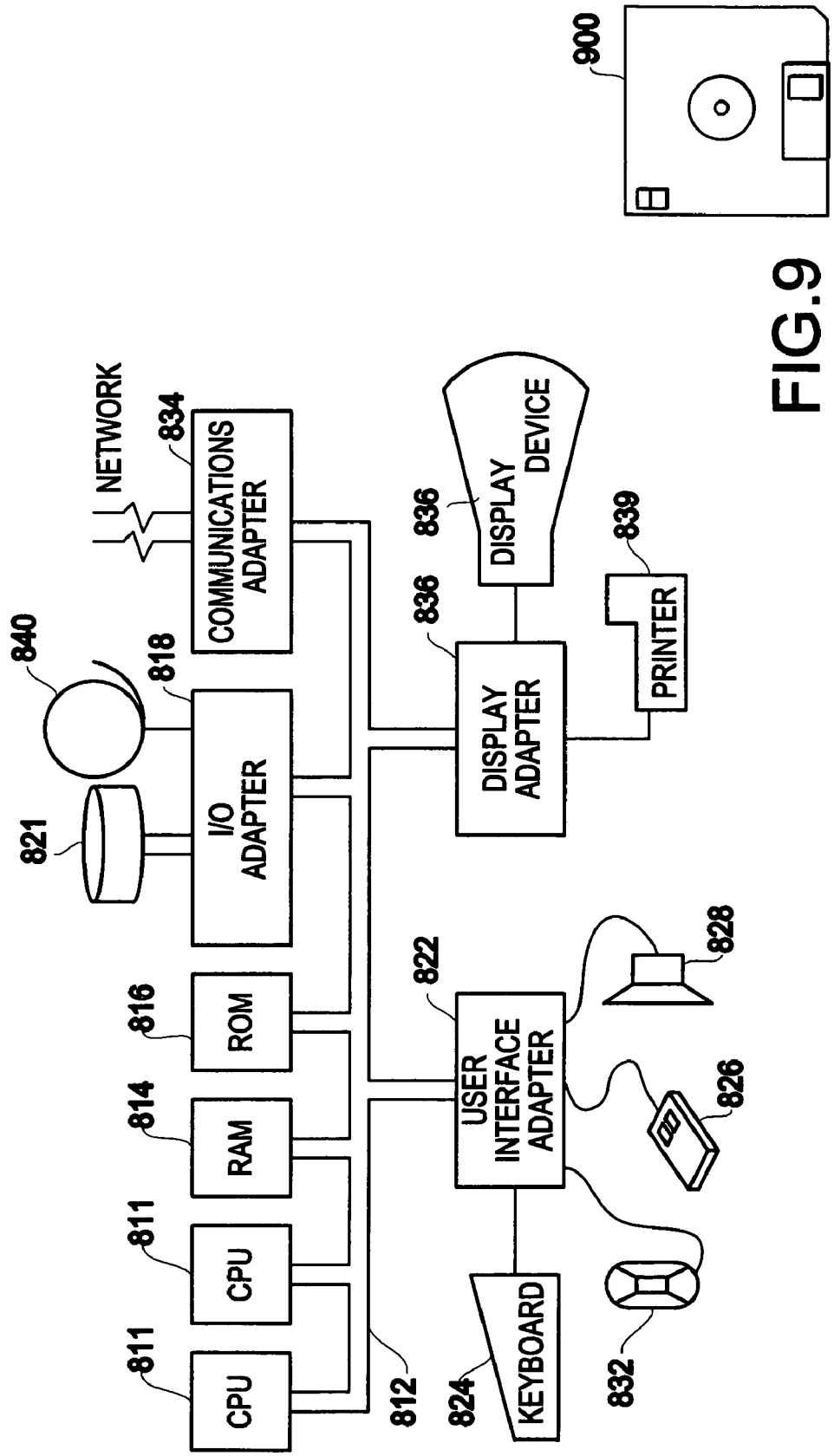

METHOD AND APPARATUS FOR CONSTRAINED SYSTEM ATTRIBUTE ALLOCATION UNDER UNCERTAIN USAGE PROFILES

BACKGROUND OF THE INVENTION

1. Field of the Invention

The present invention generally relates to the prioritization of resources for developing and maintaining a system. More specifically, a stochastic optimization framework provides a method for allocating effort at different stages of the product lifecycle to meet a specified target system objective so that these resources are allocated to system components in a way that most efficiently achieves a target for a system attribute, such as reliability or performance.

2. Description of the Related Art

A problem addressed by the present invention involves the question of how to prioritize development resources so that they are allocated to system components in a way that most efficiently achieves a target for a system attribute, such as reliability or performance. These two attributes are presented only for purpose of discussion, since other system attributes can also be addressed by this method. As non-limiting examples, capability, maintainability, serviceability, upgrade capability, availability, usability, and replaceability are other system attributes that a system resource allocation decision maker might wish to consider in the resource allocation process.

Planning involves attention to components that will make up the system, and the system metric is determined by inheritance combining attributes of the components (e.g., system reliability as a function of components) as well as intended use (e.g., highway versus city driving for usage of an automobile).

This instance of the problem assumes that the observable system attribute (in operation) will be a function of the realized usage pattern, also called a "usage profile" or "operational profile."

In practice, the methods for targeted engineered testing generally assume a known usage environment. In practice, the usage environment may be uncertain or may be dynamic. This is especially important as the high-level componentization of software systems becomes more common. By high-level, it is meant that what were once considered as individual products are now bundled together in different ways and sold as software systems. An example is the componentization of IBM software offerings, which bundles key elements of products such as its database products, security products, and web application development products together so that they are quickly deployable in a customized setting.

The usage of the components may vary widely from setting to setting, but reliability targets for the individual components need to be allocated so that overall reliability targets are achieved across a range of settings. Allocation methods help to move resource decisions earlier in the development stages, to design, where uncertainty about usage may be even higher than in testing. However, early design focus may have the greatest potential to achieve system targets most efficiently.

One known solution to the optimal allocation problem is to assign all components a common attribute target corresponding to the system target and operation mission time. This may not be the most efficient means for achieving the system target, since components which are more costly to develop may have lesser impact on the system attribute (i.e., may only be used rarely given the usage environment and system architecture). Solutions for optimal reliability allocation to software components for well known software economic cost models are given in a paper by Helander, Zhao and Ohlsson ("Planning Models for Software Reliability and Cost," IEEE Transactions on Software Engineering, Vol. 24, No. 6, June 1998, pp.420-434). The drawback of these solutions is that they consider the usage profile as deterministic and more cost efficient allocations of resources may exist to achieve the same system target when component usage is not uniform.

The consideration of varying usage profiles has been addressed only on an ad-hoc or simplistic basis. For example, Poore, Mills and Mutchler ("Planning and Certifying Software System Reliability," IEEE Software, Vol. 10, No. 1, pp. 88-99, 1993) used a spreadsheet approach to consider various strategies for allocating reliability to software modules assuming an operational profile specified up to an fixed allowable variation, where the allowed variation is the same across all operations. Leung ("Software reliability planning models under an uncertain operational profile," Journal of the Operational Research Society, Vol. 48, 401-411, 1997) uses a non-linear optimization approach to solve the same problem, focusing primarily on software modules as components of a single software entity, where the focus is on resource allocation for testing.

Currently, there are no known methods for cost effective development planning that take into account uncertainties about the ultimate usage environment in a unified way, including development effort earlier in a product's lifecycle.

Thus, in the art of modeling system design and providing product lifecycle resource allocations, a need exists for a technique that includes the uncertainty of the usage.

SUMMARY OF THE INVENTION

In view of the foregoing, and other, exemplary problems, drawbacks, and disadvantages of the conventional system, it is an exemplary feature of the present invention to provide a method of optimizing allocation of resources at various stages of the product lifecycle for a system having uncertain usage.

It is another exemplary feature of the present invention to provide a technique in which usage profiles are incorporated into a mathematical optimization technique by characterizing usage as a random variable.

It is another exemplary feature of the present invention to provide a technique of optimization of uncertain usage as based on using the characterization given by a Dirichlet distribution function.

To achieve the above exemplary features and others, in a first exemplary aspect of the present invention, described herein is a method (and structure) of planning allocation of resources for a system comprising a plurality of components, including characterizing the system attribute of interest in terms of uncertain system usage.

In a second exemplary aspect of the present invention, described herein is a signal-bearing medium tangibly embodying a program of machine-readable instructions executable by a digital processing apparatus to perform a method of planning an allocation of resources for a system, the machine-readable instructions including a calculator module to compute an optimum solution for a planning allocation of development resources for a system comprising a plurality of components, wherein the system usage is uncertain.

In a third exemplary aspect of the present invention, described herein is a system, including a means for 1) selecting an attribute of the system which is of interest, 2) receiving a target value for an attribute of a system comprising a plurality of components, 3) specifying categories of usage, 4)

specifying the system attribute as a function of the system components and the system usage, 5) selecting a method to characterize the uncertainty in the system usage, 6) selecting a cost function to describe cost of system developing system component, and 7) computing an optimum solution for planning allocation of resources for the system.

Thus, the present invention provides an improvement in the method of minimizing cost of developing and maintaining a system by optimizing the allocation of resources to the various components making up the system. The present invention can enable development of offerings and solutions for a broader customer base without extensive customization or rework, since the system components are designed so that the system will meet a system attribute target objective, even under uncertain usage profiles, such as when the usage may be highly variable after the product is released.

Additional benefits flowing from the present invention include: (1) more efficient (e.g., less costly, quicker) development of a system to meet a target system attribute level; (2) significantly less rework involved in maintaining the system when new functionality or other changes are made and when the system is introduced into a new operational environment with a potentially different and unknown uncertainty while maintaining the system attribute level; and (3) an analytical framework that helps motivate better design principals upstream since it encourages designers to create components that are not overly complex, are reusable and have properties which make achieving the attribute at the component level more easy.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 8 illustrates an exemplary hardware/information handling system 800 for incorporating the present invention therein; and FIG. 9 illustrates a signal bearing medium 900 (e.g., storage medium) for storing steps of a program of a method according to the present invention.

DETAILED DESCRIPTION OF EXEMPLARY EMBODIMENTS OF THE INVENTION

Figure 1:
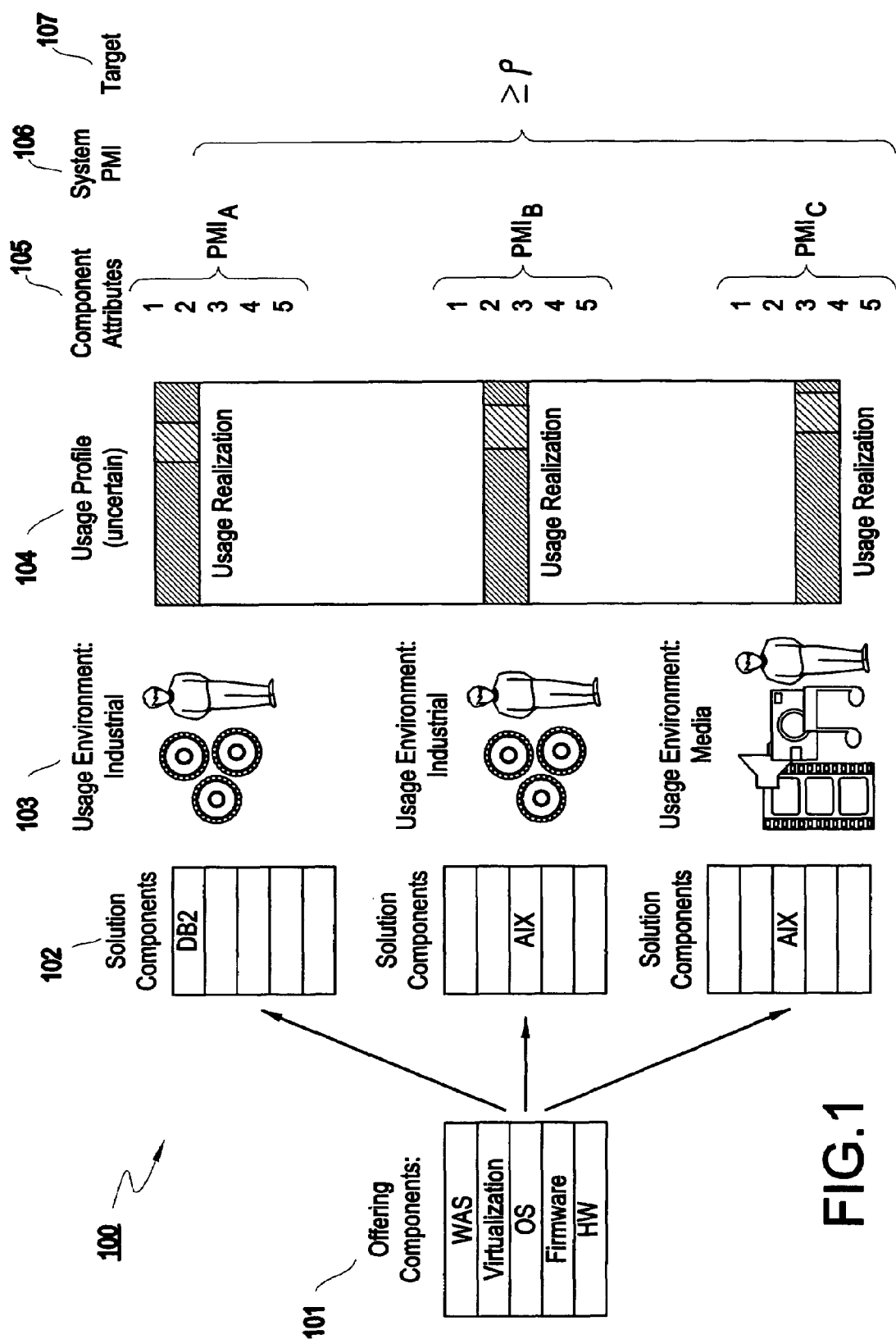
FIG. 1 shows an exemplary scenario 100 appropriate for the application of the present invention.

Referring now to the drawings, and more particularly to FIGS. 1-9, an exemplary embodiment of the present invention will now be described.

The present invention provides a method for characterizing uncertainty in the usage of a system of components and incorporating this uncertainty into a planning framework for achieving a specified target for system metrics, such as reliability, performance, availability, serviceability, maintainability, etc.

A non-limiting example of a possible scenario for the present invention might be reliability planning for an integrated hardware/software offering, such as an On-demand operating system. A planner may want to allocate resources to achieve different levels of reliability among components of an offering but which combine to reach an overall system reliability target under a variety of different system usage scenarios. For example, some users might write applications requiring more data queries, or requiring differing amounts of storage, differing security checks, or being more computationally intensive than peripheral intensive (e.g., processor speed versus communication).

In a second scenario, an automobile is to be built to meet a specified performance target. There may be a need to allocate performance targets among the car's components (e.g., carburetor, tires, steering, and cooling system) so that a specified performance target for the car is achieved no matter the usage, e.g., different altitudes, temperatures, and types of terrain in which the car is driven.

Another example might be embedded systems which have some performance metric of interest where measurement is based on inherited properties from components and usage varies widely in the operation environment.

As mentioned above, planning frameworks already exist where usage is certain, such as component reliability allocation to achieve a system reliability target. Planning frameworks also exist where usage is uncertain but analysis only reflects consideration of sample points or a uniform potential deviation of usage of the system from that specified for each anticipated operation. In, for example, manufacturing, planning frameworks exist for planning system output (e.g., production) as a function of uncertain system input (e.g., demand), but not to system attributes related to reliability, performance, etc. No one has developed a method for component-based construction of systems under general formulation of uncertain usage for guiding the development process earlier than testing phases.

A key feature of the present invention is the formulation of the allocation problem as a nonlinear, constrained optimization problem, where the usage profile parameters are treated as random variables. The resulting formation is a stochastic optimization problem whose solution can be used to improve efficiency of system development or maintenance when the ultimate operating environment involves usage that is uncertain.

The invention works by solving a mathematical optimization problem to find optimal allocation of a system metric among components. This solution may be automated by a computer program implementation of an algorithm to solve the problem, which may vary depending on the characterization of the uncertainty in usage, the way in which the component attributes combine to give the system attribute, and characteristics of the cost functions assumed for attribute attainment for each component. Designers of component-based systems may use this invention, for example, in the system development phase, once a system design has been established via components and their functionality, and how they interact. They may also use this invention at other stages of the product lifecycle, such as when determining how to allocate resources to maintain a system after it has been released. The allocation given by the invention would be used to prioritize and direct resources to individual components.

FIG. 1 graphically demonstrates an exemplary design scenario 100 appropriate for the present invention. Development resources are allocated for a system 101 having five components, including hardware, firmware, an operating system and two layers of software, e.g. virtualization software to provide a way to abstract physical resources so they can be accessed as a pool of logical resources and the Websphere Application Server (WAS) software for deployment of Web applications.

The system 100 may have a basic configuration but will be available in three specific variations 102 (e.g., A, B, C), two of which incorporate the AIX operating system and one of which incorporates DB2, IBM's relational database management system software, as a high-level application module. Each of the three variations has different operating environments 103 (e.g., two in the industrial sector and one in media).

Therefore, each component of the system understandably has different usage profiles 104. Herein, the concept of a "component" is any portion of a system that can be characterized in terms of a performance metric of interest (PMI), such as reliability, availability, serviceability, etc., and, as indicated in FIG. 1, might include hardware and/or software units.

Thus, in FIG. 1, each of the five components can be characterized 105 in terms of the selected PMI, and a system level PMI 106 (e.g., $PMI_A$, $PMI_B$, $PMI_C$) can be calculated from these component attributes 105 and a specified usage profile. The ultimate question for the allocation of design and development resources is how best to allocate resources to ensure that the system PMIs meet some target value 107.

Figure 2:
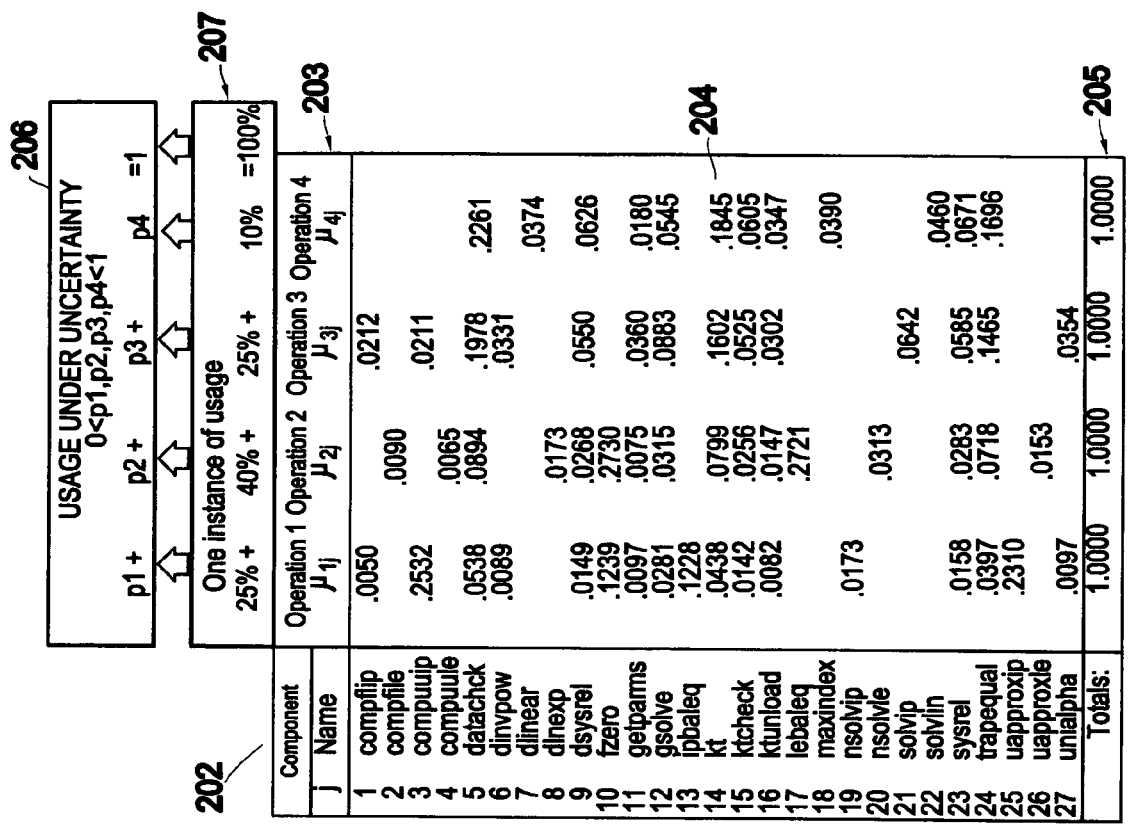
FIG. 2 shows an exemplary scenario 200 in which a component-based software product 201 is used to demonstrate the concept of usage under uncertainty.
Figure 2:
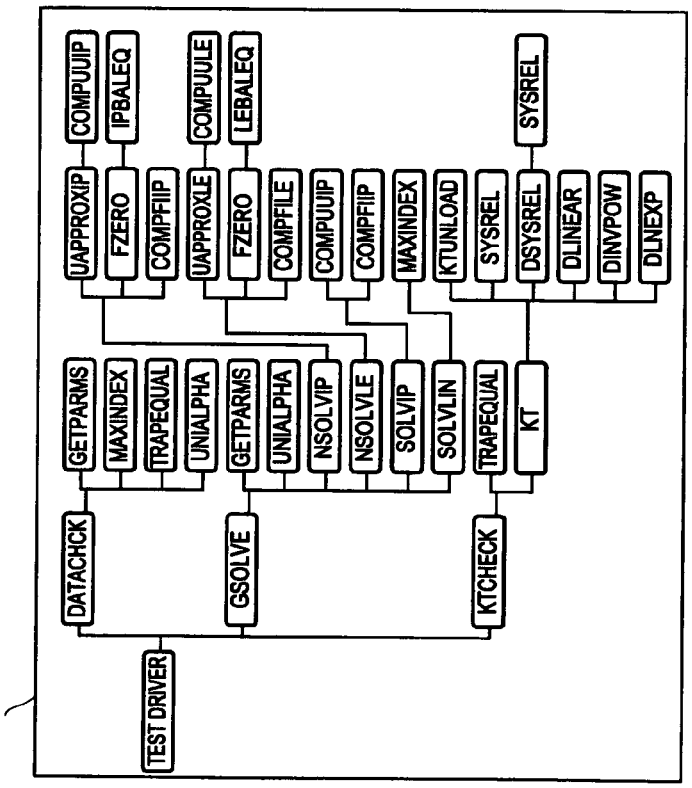

FIG. 2 exemplarily shows the concept of distribution of usage for a component-based software system 200 having the exemplary call tree 201. The system 200 has 27 components 202 and four operations 203 are envisioned for the system to accomplish. For each operation 203, various of the 27 components are used in different percentages, as exemplarily shown in tabular format 204. It is noted that, for each operation 203, the sum of the usage of all components is 1.0 (e.g., see label 205), and the usage percentages across different operations sums to 1.0 (see label 207).

In an exemplary instance of usage 207, the four operations 203 are shown as having percentages of usage that add up to 100%. The illustrated instance of usage 207 might be the usage of the operations as the system is typically used by Person A. It should be recognized that Person B might use the system differently, so that the percentage of usage of the four operations would differ for Person B. Thus, the usage of the four operations can vary from person to person, each person thereby having a usage profile 207. The present invention incorporates this uncertainty of usage by considering usage profiles as being random variables.

Figure 3:
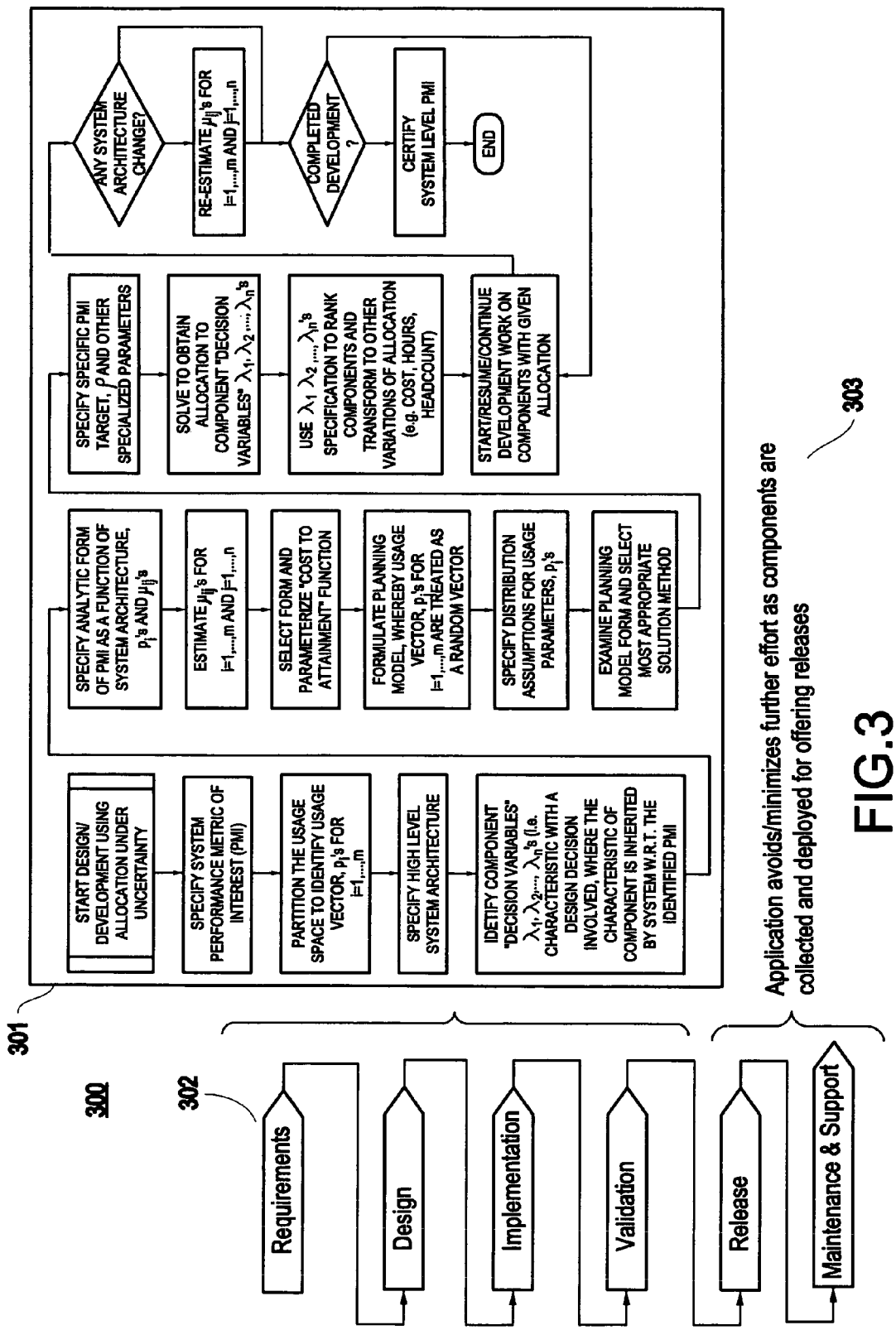
FIG. 3 shows the application 300 of the present invention in a typical product life cycle.

As shown in FIG. 3, the application 300 of the present invention, as exemplified by the flowchart 301 to be discussed in more detail below, in the design stages 302 of a typical product lifecycle can avoid or minimize further efforts as components are deployed for offering releases 303, since the attribute target ρ, such as a specified cost or reliability, will be met for each system offering as a result of the resource allocation computed by the methods taught by the present invention.

An approach of the present invention is based on knowledge of the linkage between the operational profile and the architecture of the system, but allows for uncertainty through the use of probability distributions to characterize usage. Stochastic optimization methods are used to obtain efficient solutions to the allocation problem.

The discussion below describes the mathematics for the modeling framework for cost and reliability planning in software system development that allows for random variation in the operational profile, but as noted above, the present invention is not limited to these two attributes or to software system development.

The 1998 paper by Helander, M. E., Zhao, M., and Ohlsson, N., "Planning Models for Software Reliability and Cost", *IEEE Transactions on Software Engineering*, Vol. 24, No. 6, 420-434, provides an analytical solution to the optimal allocation problem based on standard nonlinear optimization methods. A component utilization matrix is used to link system structure to operations, which are partitionings of the software system from a user's perspective.

The present invention builds directly on this framework of Helander et al., by allowing for uncertainty in the operational profile through the use of probability distributions on the operation occurrences. The underlying mathematics are described below in the framework of a particular exemplary attribute, reliability. Other attributes could be employed as would be known by one of ordinary skill in the art taking the present Application as a whole.

Mathematical Formulation as an Optimal Planning Problem

Let n denote the number of software components. In assembling components to form a software offering, the components are desired to be reliable enough so that the probability of failure-free execution for a configured system has probability of at least ρ (0<ρ<1) of achieving failure-free execution with respect to an execution time interval of length τ. The problem of interest is to determine what the failure intensities of the individual components should be to achieve this target in the most cost effective manner. This assumes a cost associated with achieving a failure intensity value, a common concept in software engineering economics.

Denote $f(\lambda_1, \lambda_2, \ldots, \lambda_n)$ as the total cost of achieving the failure intensities $\lambda_1, \lambda_2, \ldots, \lambda_n$, which we assume to be a pseudoconvex, non-increasing function of the $\lambda_j$'s. The function $R(\lambda_1, \lambda_2, \ldots, \lambda_n; \tau)$ measures system reliability in terms of $\lambda_1, \lambda_2, \ldots \lambda_n$, which will be used as the main decision variables in the reliability allocation cost-optimization problem.

The following model simultaneously finds $\lambda_1, \lambda_2, \ldots \lambda_n$:

$$\text{Minimize } f(\lambda_1, \lambda_2, \ldots, \lambda_n) \tag{1}$$

Subject to:

$$R(\lambda_1, \lambda_2, \ldots, \lambda_n; \tau) = \exp\left\{-\sum_{j=1}^{n}\sum_{i=1}^{m} p_i \mu_{ij} \lambda_j \tau\right\} \geq \rho \tag{2}$$

$$\lambda_j = 0 \text{ for } j = 1, \ldots, n \tag{3}$$

where $$0 < p_i < 1, \sum_{i=1}^{m} p_i = 1,$$

are the operational profile parameters which partition usage across a set of m potential operations and $\mu_{ij}$ ($0 \leq \mu_{ij} \leq 1$) are the component usage parameters for $i=1, \ldots, m$ operations and $j=1, \ldots, n$ components with $$\sum_{j=1}^{n} u_{ij} = 1$$

for each i. Note that the reliability function in (2) is derived under the assumption that failure events are statistically independent and the system architecture is such that a failure in one component causes failure of the entire system, i.e. the system is not fault-tolerant with respect to the components as identified in the planning model. Other forms for R (·) could be derived under different assumptions concerning the system architecture. Other system measurements, as functions of the components, may also be derived.

This model specified by (1), (2), and (3) is the multivariate, nonlinear, constrained optimization model introduced in Helander et al. (1998). It can be equivalently restated as:

Minimize $f(\lambda_1, \lambda_2, \ldots, \lambda_n)$ (4)

Subject to:

$$g_0(\lambda_1, \lambda_2, \ldots, \lambda_n) = \rho \ln(\rho) + \rho \tau \sum_{i=1}^{m} p_i \sum_{j=1}^{n} \mu_{ij} \lambda_j \leq 0 \quad (5)$$

$$g_J(\lambda_1, \lambda_2, \ldots, \lambda_n) = -\lambda_j = 0 \text{ for } j = 1, \ldots, n \quad (6)$$

which follows a standard nonlinear programming model form involving minimization of a nonlinear objective function constrained by "$\leq 0$" inequalities. Conditions and solutions for this form are given in Helander et al. for some common cost functions in software economics (see, e.g., Boehm, B. W. *Software Engineering Economics*, Prentice-Hall, N.J., 1981, and Helander, M. E., Zhao, M., and Ohlsson, N., "Planning Models for Software Reliability and Cost", *IEEE Transactions on Software Engineering*, Vol. 24, No. 6, 420-434, 1998).

In this framework, uncertainty in the operational profile can be introduced by treating the operational profile parameters as random variables, giving a stochastic programming formulation. This formulation and general solutions are discussed in the next section.

Stochastic Optimal Reliability Allocation

Let $\vec{\xi} = \{\xi_i, \ldots, \xi_m\}$ denote the random vector representing random variables replacements for the deterministic operational profile parameters in constraint (5), $p_i$, i=1, . . . , m. The decision model stated by (4), (5) and (6) in the context of a random operation profile leads to a problem statement:

"Minimize" $f(\lambda_1, \lambda_2, \ldots, \lambda_n; \vec{\xi})$ (7)

Subject to:

$$G_0(\lambda_1, \lambda_2, \ldots, \lambda_n; \vec{\xi}) = \rho \ln(\rho) + \rho \tau \sum_{i=1}^{m} \xi_i \sum_{j=1}^{n} \mu_{ij} \lambda_j \leq 0 \quad (8)$$

$$g_J(\lambda_1, \lambda_2, \ldots, \lambda_n) = -\lambda_j \leq 0 \text{ for } j = 1, \ldots, n \quad (9)$$

In this formulation, $g_0$ is replaced by $G_0$ to indicate that $g_0$ is now a random variable.

As noted in Kall and Wallace (Kall, P. and Wallace, S. W., *Stochastic Programming*. John Wiley and Sons: New York, 1994), this problem as a whole, and the constraint (8), are not well defined when trying to make a decision for setting the $\lambda_1$, $\lambda_2$, . . . , $\lambda_n$ values, prior to knowing a realization of $\vec{\xi}$.

To address this, a deterministic equivalent of the model specified by (7), (8) and (9) is needed. One alternative is to solve a problem such as $P[G_0(\lambda_1, \lambda_2, \ldots, \lambda_n; \vec{\xi}) \leq 0] \geq p,$ (10)

where 0<p<1 represents the chance that the overall reliability target is met.

It is noted that, when a realization of $\vec{\xi}$ is specified, e.g., as $p_i, \ldots, p_m$, then the values of $p_i$ should sum to one, and each value must be between zero and one. A convenient probability distribution that achieves these properties is a Dirichlet distribution. A random variable $\vec{\xi}$ is said to follow a Dirichlet distribution if its probability distribution function has the form $$p(\vec{\xi}) = Dirichlet(\vec{\xi}; u) = \frac{1}{Z(u)} \prod_{i=1}^{m} \xi_i^{u_i - 1}, \quad (11)$$

when $\xi_1, \ldots, \xi_m \geq 0$, $\Sigma_{i=1}^{m} \xi_i = 1$ and $u_1, \ldots, u_m > 0$. The normalization constant is $$Z(u) = \frac{\prod_{i=1}^{m} \Gamma(u_i)}{\Gamma\left(\sum_{i=1}^{m} u_i\right)}. \quad (12)$$

A univariate Dirichlet distribution reduces to a standard Beta distribution. The values $u = (u_1, \ldots, u_m)$ determine the shape of the distribution. Additional details on Dirichlet distributions can be found in Kotz, S., Balakrishnan, N., and Johnson, N. (*Continuous Multivarite Distributions, Volume 1. Models and Applications,* John Wiley and Sons: New York, 2000).

Standard results in stochastic optimization, for example Kall and Wallace, show that a solution involving (10) is obtained by applying the same non-linear programming techniques used to solve the deterministic formulations. For example, when (10) is quasiconvex and differentiable with respect to $\lambda_1, \lambda_2, \ldots, \lambda_n$, then the Kuhn-Tucker conditions may be used to characterize and identify an optimal solution. Application of such techniques, including validation of properties such as quasiconvexity for (10), requires derivation of the distribution of $G_0$. The next subsection gives this derivation.

Derivation of the Distribution for $G_0$

Upon examination of expression (10), it can be seen that $G_0$ is basically a shifted and scaled linear combination of Dirichlet random variables. Recent results by Provost and Cheong (Provost, S. B. and Cheong, Y.-H., "On the distribution of linear combinations of the components of a Dirichlet random vector", *The Canadian Journal of Statistics,* vol. 28, 417-425, 2000) provide an expression for the cumulative distribution function of a linear combination of Dirichlet random variables in integral form.

Letting a=$\rho \log(\rho)$, b=$\rho \tau$ and $$c_i = \sum_{j=1}^{n} \mu_{ij} \lambda_j$$

in (8), the distribution function is given by $$F_{G_0}(z) = \frac{1}{2} - \frac{1}{\pi} \int_0^{\infty} \frac{\sin\left[\frac{1}{2} \sum_{i=1}^{m} 2u_i \tan^{-1}\left\{\left(c_i - \frac{z-a}{b}\right)u\right\}\right]}{u \prod_{i=1}^{m} \left\{1 + \left(c_i - \frac{z-a}{b}\right)^2 u^2\right\}^{(2u_i)/4}} du, \quad (13)$$

for a+b min($c_i$)<z<a+b max($c_i$).

As stated above, the Kuhn-Tucker sufficient conditions can be used to find the solution to the stochastic optimization problem provided (10) is quasiconvex and differentiable with respect to the $\lambda_i$'s. For other cases, numerical approaches can be used.

Figure 4:
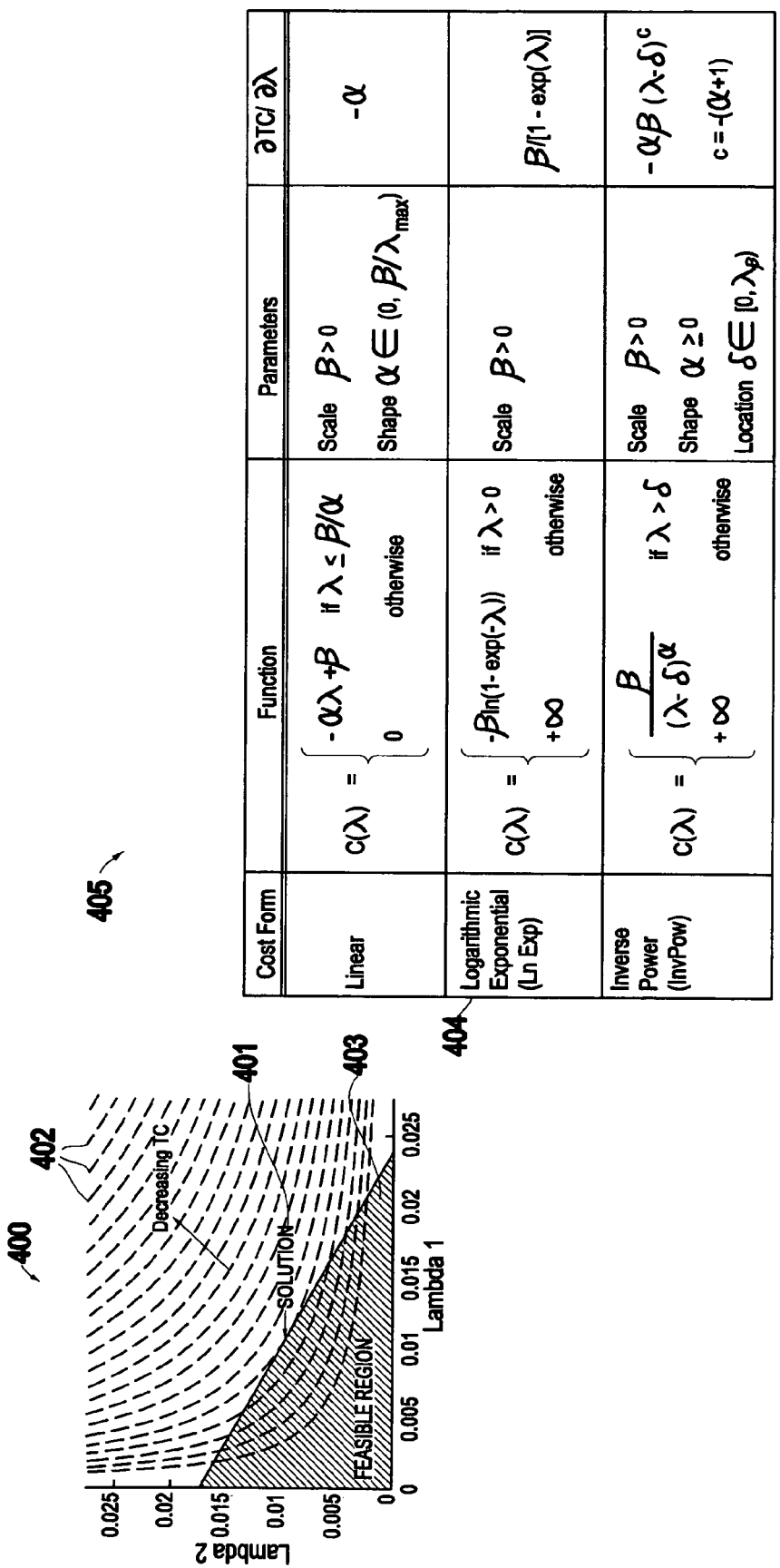
FIG. 4 shows an exemplary deterministic solution 400.
Figure 5:
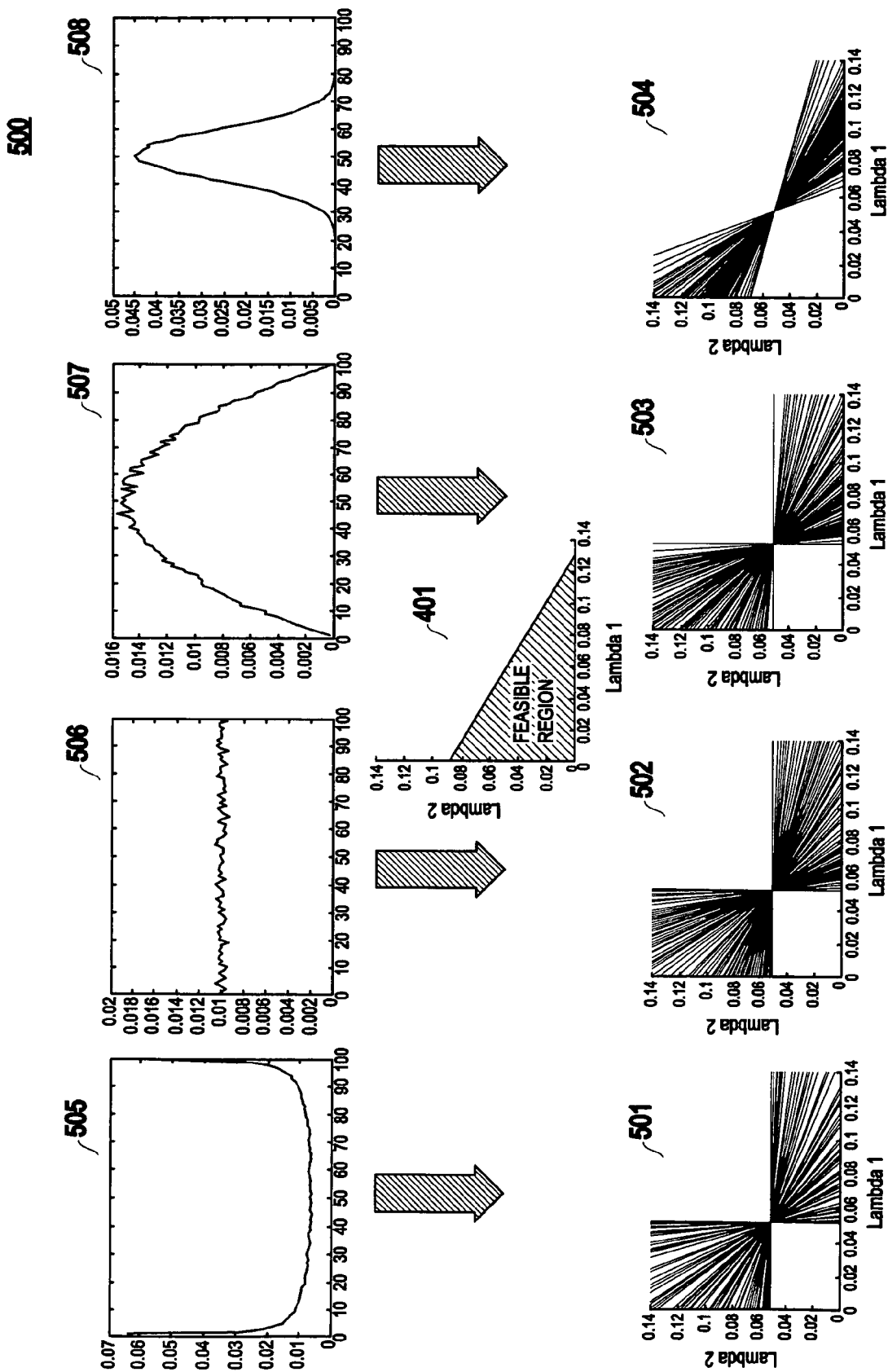
FIG. 5 shows the effect 500 of different Dirichlet parameter values on the feasible solution region 401.

FIGS. 4 and 5 graphically illustrate the effect of uncertainty on the allocation problem by extending the n=2 components example from Helander et al. FIG. 4 shows the solution for a deterministic version 400 of the model specified by (1), (2), and (3) as being a lowest point 401 between the series of total cost equations 402 and the shaded area 403 representing the feasible region. The example in this figure shows the two-component solution for LnExp component cost function, 404, as selected to be the cost model from the three model forms shown in table 405.

FIG. 5 shows how the feasible region 401 will correspondingly be affected 501-504, as uncertainty is taken into account in accordance with the present invention. If uncertainty in the usage profile is characterized by assuming the $p_i$'s follow a Dirichlet distribution with a common shape parameter u (e.g., 505-508), the effect is observed by the shifting of the main reliability constraint, as can be seen by comparing the shape of the feasible region 401 of the deterministic solution of FIG. 4 with the varying regions shown in 501-504. This is illustrated graphically in FIG. 5 for u=0.5, 1, 2, 16.

Figure 6:
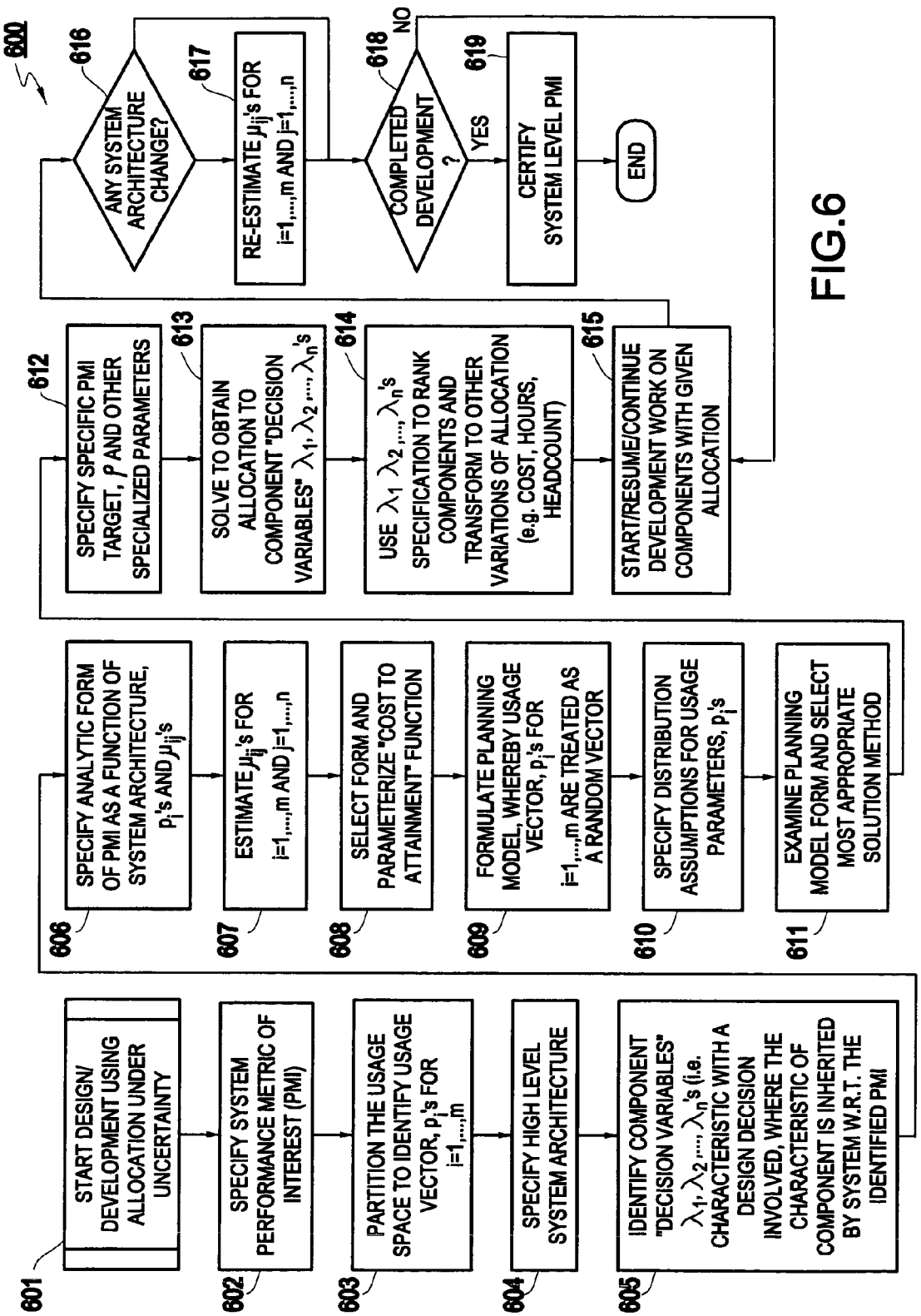
FIG. 6 exemplarily shows in flowchart 600 the steps included in an exemplary embodiment of the present invention.

FIG. 6 shows an exemplary embodiment of the present invention in the form of a flowchart of the inventive method. In step 601, the design process is started, as including resource allocation based on uncertainty.

In step 602, the user specifies the performance metric of interest (PMI). Although the discussion above focused on system reliability, the present invention is not intended as limited to this PMI. The PMI selection might be made by an entry technique such as clicking from a listing of possible PMI choices. The present invention is also not limited to optimization of a single PMI. Thus, the user could enter more than one PMI.

In steps 603 through 610, the data for the model is entered, but it should be recognized that this data could also be entered as data from various data documents or databases. Thus, in step 603, the possible operations for the system are entered. In step 604, the system architecture is entered and in step 605 the component decision variables are entered. These decision variables are the characteristics in which a design decision is involved, where the characteristics of the component are inherited by the system, with respect to the specified PMI. In step 606, the user specifies from a listing the specific analytic form of the PMI to use as a function of the system architecture and the usage profile, such as that specified in (2).

In step 607, the relative usages $\mu_{ij}$'s of each component within each operation are entered and, in step 608, the cost function is selected and parameterized. In step 609, the planning model is formulated as in (7)-(10), described in prior section.

In step 610, the user specifies which distribution function for usage is to be assumed, such as Dirichlet distribution. A jointly uniform distribution could also be used, a particular solution to which is discussed in Leung (1997).

In step 611, the user specifies which solution method is to be used. For example, in a preferred embodiment, the method used is that which finds solution such that target value ρ is reached with a specified probability. An alternative is that solution is found such that the expected reliability reaches a particular target and the variability in reliability is less than a specified value.

In step 612, the PMI target value ρ is entered so that the optimal solution can be calculated in step 613.

In step 614, the solution may be transformed into other variations of allocation, such as "X number of person-hours". For example, if Component i is to achieve a failure intensity of $\lambda_i$, historical data on person-hours from previous development of that component and its achieved reliability can be used to translate the current specified reliability into required person-hours.

In steps 615-619, the design process is then undertaken or continued and the process of re-design continues until the target PMI objective is determined as having been met in step 619 for the development effort.

Exemplary Hardware Implementation

Figure 7:
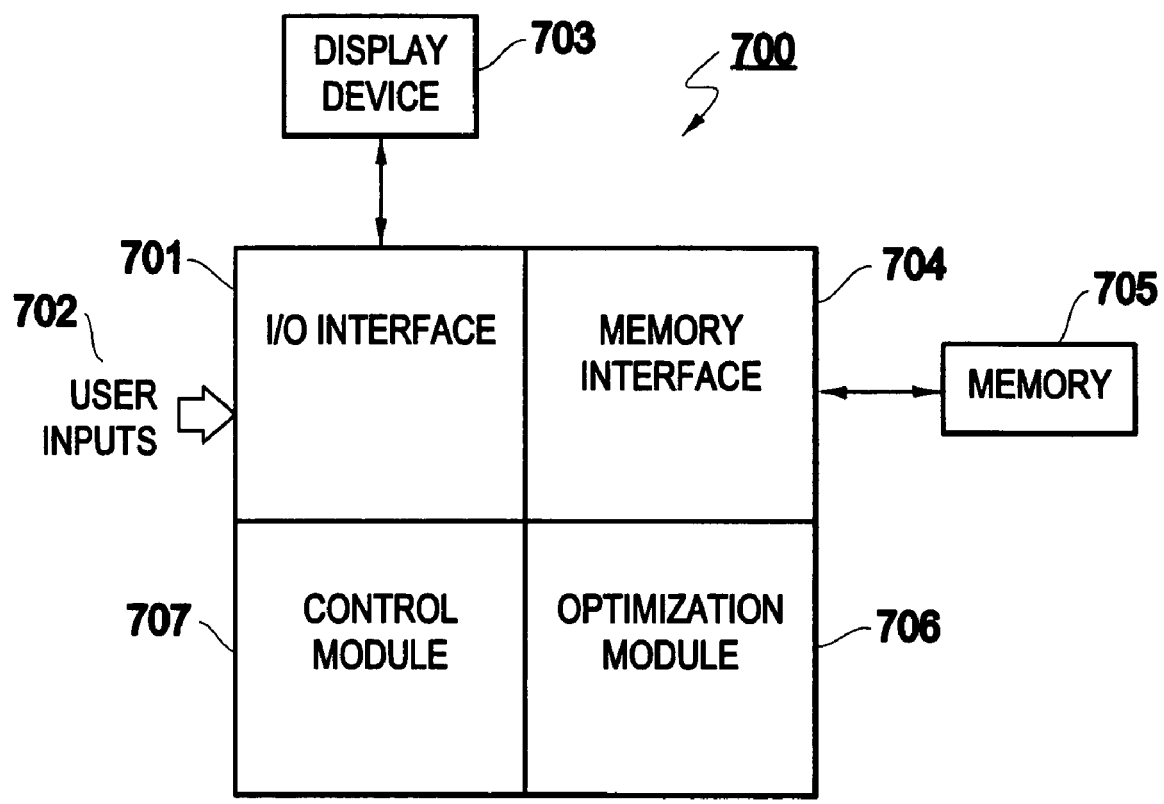
FIG. 7 shows an exemplary block diagram 700 of a computerized tool for executing the present invention.

FIG. 7 shows an exemplary block diagram of a computerized tool 700 to execute the present invention. An Input/Output module 701 permits user interface for data entry and selections of choices from various lists as discussed above for FIG. 6. Display device 703 allows results of the computations and the user's listings of choices to be presented, as well as a display of the graphical user interface (GUI) for user interactions such as clicking from a listing.

Memory interface 704 allows data to be retrieved and saved into a memory device 705. As discussed above, it is possible to enter data into one or more documents saved in memory prior to using the tool for calculating feasible solutions as well as an optimum solution. Also, the various models underlying the various listings discussed above that are available for user selection could be stored in memory module 705, along with the various parameters entered by the user to control the models.

Optimization module 706 is the computing module that calculates the optimal solution in accordance with the selected solution method. In a non-limiting exemplary embodiment, the optimization model is based on the Dirichlet distribution for characterizing uncertain usage, as discussed above.

Control module 707 is a higher-level software module that controls the tool as based on inputs from the user, such as to move through a series of events corresponding to those discussed above for FIG. 6.

FIG. 8 illustrates a typical hardware configuration of an information handling/computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other signal-bearing media suitable for storage of instructions, including instructions stored in memory devices in formats suitable for transmission, such as instructions stored in digital and analog formats as might be used for storage of instructions in memory devices located in communication links and in wireless systems. In an illustrative embodiment of the invention, the machine-readable instructions may comprise software object code.

In yet another aspect of the present invention, the techniques discussed above can also be used as the basis for a service that engages in providing the service of technical consulting. For example, a business entity might provide consultation for planning a product development, in which consultation the present invention is utilized. It is also intended that the present invention is intended to cover the scenario in which the method or a service derived therefrom is executed via a computer network, such as the Internet.

It can be readily seen from the discussion above, that, in its possible applications, the present invention can enable development of offerings and solutions for a broader customer base without extensive customization or rework. It can provide a framework supporting component-based deployment strategies. The present invention is also further fueled by a growing market for multi-purpose devices, such as cell phones with cameras, for which usage could be highly variable and completely unknown during development.

There are a number of additional benefits which flow from the present invention, including more efficient development of a system to meet a target system attribute level. It also allows significantly less rework involved in maintaining the system when new functionality or other changes are made and when the system is introduced into a new operational environment with a potentially different and unknown uncertainty while maintaining the system attribute level.

Moreover, the present invention also provides an analytical framework that helps motivate better design principles upstream, since it encourages designers to create components that are not overly complex, are reusable, and have properties which make achieving the attribute at the component level easier.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

The invention claimed is:

1. An apparatus, comprising:
    a processor to calculate a planning allocation of resources for stages of product life cycle of a system comprising a plurality of components, based upon characterizing a system attribute of interest by an uncertainty of usage of said system, said uncertainty of usage described using random variables whose values are characterized by a probability distribution that describes a potential usage of said components; and
    a graphical user interface for interacting with a display device selectively permitting information of said planning allocation of resources to be viewed by a user.

2. The apparatus of claim 1, wherein said planning seeks to attain a target of a system attribute for said system.

3. The apparatus of claim 2, further comprising:
    computing an optimal solution for said allocation of resources to achieve said target.

4. The apparatus of claim 2, wherein said attribute comprises at least one of:
    reliability;
    performance;
    capability;
    maintainability;
    serviceability;
    upgrade capability;
    availability;
    usability; and
    replaceability.

5. The apparatus of claim 4, where said system attribute is characterized as a function of an operational profile and system architecture.

6. The apparatus of claim 2, wherein said system comprises software components, said software components optionally including multiple software entities or multiple subsystems or modules of a single software entity.

7. The apparatus of claim 1, wherein said usage is characterized by an operational profile wherein a plurality of operations are included.

8. The apparatus of claim 7, wherein said operational profile is characterized by a probability distribution.

9. The apparatus of claim 8, wherein said probability distribution comprises a Dirichlet distribution.

10. The apparatus of claim 1, wherein said uncertainty of usage is based on a usage of each component in said system for an operation.

11. The apparatus of claim 10, said uncertainty of usage further being based upon usages of each said component over a plurality of operations to generate an operational profile.

12. An apparatus, comprising:
    a processor to compute an optimum solution for a planning allocation of product life cycle resources for a system comprising a plurality of components, wherein said system is characterized by an uncertainty of usage, said uncertainty of usage described using random variables whose values are characterized by a probability distribution that describes a potential usage of said components; and
    a memory interface to store said optimum solution in a memory.

13. The apparatus of claim 12, wherein said optimum solution is based on a pre-selected target for an attribute of said system.

14. The apparatus of claim 12, wherein said usage is characterized by an operational profile.

15. The apparatus of claim 14, wherein said operational profile is characterized as a collection of random variables.

16. The apparatus of claim 15, wherein a Dirichlet distribution is used to characterize the collection of random variables.

17. A machine-readable storage medium tangibly encoded with a program of machine-readable instructions executable by a digital processing apparatus to perform a method of planning an allocation of life cycle resources for a system, said machine-readable instructions comprising:

a calculator module to compute an optimum solution for a planning allocation of life cycle resources for a system comprising a plurality of components, wherein said system is characterized by an uncertainty of usage of said components and a system architecture across the plurality of components, said uncertainty of usage described using random variables whose values are characterized by a probability distribution that describes a potential usage of said components.

18. The machine-readable storage medium of claim 17, wherein said optimum solution is based on a pre-selected target for an attribute of said system.

19. The machine-readable storage medium of claim 17, wherein said usage is characterized by an operational profile.

20. The machine-readable storage medium of claim 19, wherein said operational profile is characterized as a collection of random variables.

21. The machine-readable storage medium of claim 20, wherein a Dirichlet distribution is used to characterize the collection of random variables.

22. A system, comprising:

means for receiving a target for an attribute of a system comprising a plurality of components, said system is characterized by an uncertainty of usage and a system architecture across the plurality of components, said uncertainty of usage described using random variables whose values are characterized by a probability distribution that describes a potential usage of said components; and means for computing an optimum solution for a planning allocation of life cycle resources for said system.

* * * * *